Patented July 16, 1935

2,008,292

UNITED STATES PATENT OFFICE 2,008,292

BETA-PIPERIDINE SULPHONIC ACIDS AND THEIR PRODUCTION

Otto Nicodemus, Frankfort-on-the-Main-Hochst, and Otto Wulff, Hofheim in Taunus, Germany, assignors to I. G. Farbenindustrie Aktiengesellschaft, Frankfort-on-the-Main, Germany No Drawing. Application June 18, 1932, Serial No. 618,018. In Germany June 20, 1931

9 Claims. (Cl. 260—43)

The present invention relates to piperidine derivatives and a process of preparing the same.

We have found that the sulphonic acids of pyridine and its alkyl homologues, particularly the sulphonic acids of pyridine compounds of the following formula:

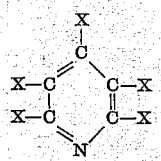

wherein one X stands for the group —$SO_3H$ either in the free state or in form of a salt, at the most two X's may stand for an alkyl group and the remaining X's stand for hydrogen can be transformed into the corresponding sulphonic acids of piperidine and its alkyl homologues by causing them to react with hydrogen in the presence of solvents and catalysts known to promote hydrogenation reactions.

Hydrogenation catalysts are for instance the noble metals, such as platinum, the metals of the iron group, such as nickel or cobalt, furthermore copper and the like. The free sulphonic acids or the salts thereof, for instance the readily soluble alkali metal salts or the salts of the alkaline-earth metals may be used in the presence of an indifferent solvent, for instance water.

In order to accelerate the hydrogenation process it may be advantageous to work at a raised pressure and a raised temperature, however, preferably below 150° C. Furthermore the reaction can be carried out in the presence of a solvent for the pyridine derivative, such as for instance water, alcohol or acetone.

The following examples serve to illustrate our invention, but they are not intended to limit it thereto:

(1) 181 grams of sodium pyridine-3-sulphonate are dissolved in 600 cc. of water; 10 grams of nickel precipitated on a porous carrier, are added. The solution is then stirred in a stirring autoclave while hydrogen is passed into the autoclave at a pressure of about 100 atmospheres and a temperature of between 120° C. and 130° C. until absorption of hydrogen no longer occurs. When about 70 liters of hydrogen have been absorbed, the mass is allowed to cool, freed from the catalyst by filtering it by suction and the filtrate is evaporated to dryness. As a residue there remains sodium piperidine-3-sulphonate in a nearly pure condition.

The reaction occurs in the same manner if other salts are used, for instance the potassium salt or calcium salt. From the latter there can be obtained, by causing it to react with sulphuric acid, a solution of the free piperidine sulphonic acid.

If the magnesium salt is used, there is obtained directly, after the catalyst has been separated, a solution of the free piperidine sulphonic acid. The yield is nearly quantitative in all cases.

The piperidine-3-sulphonic acid crystallizes very well in form of thick, colorless crystals after the aqueous solution has been concentrated. The dried acid is decomposed at a temperature of between 320° C. and 330° C. without fusing.

The piperidine sulphonic acid and its salts are readily soluble in water. They are readily oxidized by means of permanganate. The aqueous solution of the free acid has a neutral reaction. The compounds show the reactions of secondary amines, they can, for instance, be acylated readily.

(2) The $\alpha$-picoline-$\beta$-sulphonic acid can easily be transformed into the $\alpha$-pipecoline-$\beta$-sulphonic acid or the salts thereof by the same method as described in Example 1.

The yield is nearly quantitative. The compounds behave completely analogous to the piperidine-sulphonic acid and its salts.

The free $\alpha$-pipecoline-$\beta$-sulphonic acid is more readily soluble in water than is the piperidine-3-sulphonic acid. It fuses at a temperature of between 315° C. and 320° C. with decomposition.

(3) 20 grams of pyridine-3-sulphonic acid are dissolved in 200 cc. of water; a small quantity of platinum oxide is added and the solution is treated with hydrogen in a shaking vessel, while gradually raising the temperature to 50° C. As soon as the reaction is complete, platinum is eliminated by filtration and the liquid is evaporated until crystallization begins. The piperidine-sulphonic acid is obtained in a good yield.

(4) In the same manner as described in Example 1 the $\gamma$-picoline-$\beta$-sulphonic acid or its salts can be transformed into the corresponding $\gamma$-pipecoline-$\beta$-sulphonic acid or its salts.

A good yield is obtained. The substances are colorless and readily soluble in water.

(5) According to the same method of working as described in Example 1, $\alpha$-methyl-$\beta'$-ethylpyridine-$\beta$-sulphonic acid or its salts can be transformed into the corresponding $\alpha$-methyl-$\beta'$-ethylpiperidine-$\beta$-sulphonic acid or its salts.

A good yield is obtained. The substances are colorless and readily soluble in water.

(6) In the same manner as described in Example 1 the pyridine-α-sulphonic acid or its salts, obtainable by reacting with dilute nitric acid upon α-pyridyl-mercaptane, can be transformed into the corresponding piperidine-α-sulphonic acid or its salts.

A good yield is obtained. The substances are colorless and readily soluble in water.

We claim:

1. The process which comprises reacting with hydrogen, in the presence of a hydrogenation catalyst, upon a solution in an inert solvent of a compound of the following formula:

wherein one X stands for the group -SO₃H either in the free state or in form of an alkali metal or alkaline earth metal salt, at the most two X's may stand for an alkyl group and the remaining X's stand for hydrogen.

2. The process which comprises reacting with hydrogen, in the presence of a hydrogenation catalyst, upon a solution in an inert solvent of a compound of the following formula:

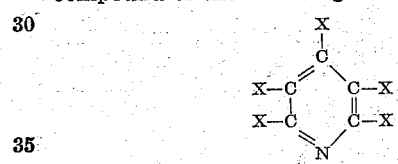

wherein one X stands for the group -SO₃H either in the free state or in form of an alkali metal or alkaline earth metal salt, at the most two X's may stand for an alkyl group and the remaining X's stand for hydrogen, at an elevated temperature not exceeding about 150° C.

3. The process which comprises reacting with hydrogen in the presence of a hydrogenation catalyst upon an inert solution of a compound of the following formula:

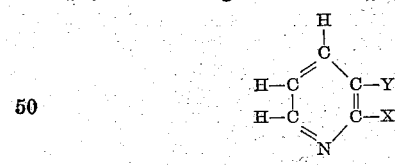

wherein X stands for hydrogen or alkyl and Y stands for the group SO₃H either in the free state or in the form of an alkali metal or alkaline earth metal salt.

4. The process which comprises reacting with hydrogen in the presence of a hydrogenation catalyst, upon an aqueous solution of a compound of the following formula:

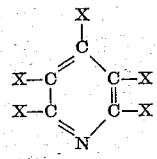

wherein one X stands for the group -SO₃H either in the free state or in form of an alkali metal or alkaline earth metal salt, at the most two X's may stand for an alkyl group and the remaining X's stand for hydrogen.

5. The process which comprises reacting with hydrogen in the presence of a hydrogenation catalyst upon an aqueous solution of the sodium salt of pyridine-3-sluphonic acid.

6. The process which comprises reacting with hydrogen in the presence of a hydrogenation catalyst upon an aqueous solution of pyridine-3-sulphonic acid.

7. The compounds of the following formula:

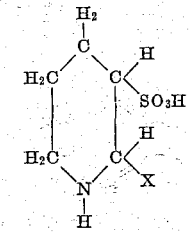

wherein X stands for hydrogen or alkyl.

8. The 3-sulphonic acid of piperidine which is decomposed at about 320° C. to about 330° C. without melting.

9. The compounds of the following formula:

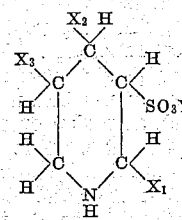

where Y stands for hydrogen, an alkali metal, or an alkaline earth metal, X₁ may stand for hydrogen or if X₂ is hydrogen, for alkyl, X₂ may stand for hydrogen or, if X₁ and X₃ are hydrogen, for alkyl and X₃ may stand for hydrogen or, if X₁ is alkyl and X₂ is hydrogen, for alkyl.

OTTO NICODEMUS.
OTTO WULFF.